United States Patent [19]

Minowa et al.

[11] 4,322,126
[45] Mar. 30, 1982

[54] MECHANICAL OPTICAL SWITCHING DEVICES

[75] Inventors: Junichiro Minowa, Yokosuka; Yohji Fujii, Yokohama; Tsutomu Aoyama; Kikuo Doi, both of Tokyo, all of Japan

[73] Assignees: Nippon Electric Co., Ltd.; Nippon Telegraph & Telephone Public Corp., both of Tokyo, Japan

[21] Appl. No.: 116,774

[22] Filed: Jan. 30, 1980

[30] Foreign Application Priority Data

Feb. 8, 1979 [JP] Japan ................................ 54/13569

[51] Int. Cl.³ ............................................. G02B 7/26
[52] U.S. Cl. .............................. 350/96.20; 350/96.16
[58] Field of Search ............... 350/96.15, 96.16, 96.20, 350/266, 269, 285, 286, 484, 485, 486, 487

[56] References Cited

U.S. PATENT DOCUMENTS

| | | | |
|---|---|---|---|
| 3,350,156 | 10/1967 | Adams | 350/285 X |
| 4,065,677 | 12/1977 | Micheron et al. | 350/96.16 X |
| 4,082,435 | 4/1978 | Zeitz | 350/269 |
| 4,124,271 | 11/1978 | Green | 350/96.20 |
| 4,146,856 | 3/1979 | Jaeschke | 350/96.20 X |
| 4,152,043 | 5/1979 | Albanese | 350/96.20 |
| 4,189,206 | 2/1980 | Terai et al. | 350/96.20 |
| 4,193,662 | 3/1980 | Hara | 350/96.15 |
| 4,204,744 | 5/1980 | Wittmann | 350/96.20 |
| 4,239,331 | 12/1980 | Aoyama | 350/96.20 |

FOREIGN PATENT DOCUMENTS

| | | | |
|---|---|---|---|
| 2531398 | 7/1976 | Fed. Rep. of Germany | 350/96.20 |
| 2412084 | 7/1979 | France | 350/96.20 |
| 52-49848 | 4/1977 | Japan | 350/96.20 |
| 54-104845 | 8/1979 | Japan | 350/96.20 |
| 54-116942 | 9/1979 | Japan | 350/96.20 |

OTHER PUBLICATIONS

Smith, "Acoustically Operated Fiber Optic Switch", *IBM Tech. Discl. Bull.,* vol. 14, No. 2, Jul. 1971, p. 652.
Papuchon et al., "Electrically Switched Optical Directional Coupler: Cobra", *A.P.L.,* vol. 27, No. 5, Sep. 1975, pp. 289-291.
Hale et al., "Mechanical Optical-Fibre Switch", *Electronics Letters,* vol. 12, No. 15, Jul. 1976, p. 388.
Mito et al., "Electrically Driven Rotating Mirror . . .", *1978 Electronic Commun. Soc. Natl. Conf.,* paper 860, Mar. 1978, 4 pp.
Nunoshita et al., "Optical Switch for Multimode Optical-Fiber Systems", *Optics Letters,* vol. 4, No. 1, Jan. 1979, pp. 27-28.
Ogiwara et al., "Optical Switching System Experiment", *IEEE Trans. on Commun.,* vol. COM-27, No. 2, Feb. 1979, pp. 517-521.
Crow, "Fiber-Optic Switch", *IBM Tech. Discl. Bulletin,* vol. 21, No. 11, Apr. 1979, p. 4686.
Fujii et al., "Low-Loss 4×4 Optical Matrix Switch for Fibre-Optic Communication", *Electron. Lett.,* vol. 15, No. 14, Jul. 1979, pp. 427-428.
Shimizu et al., "Optical Fiber Switches and Their Applications", *CLEOS '78,* paper WFF2, Feb. 1978, San Diego, Calif.

*Primary Examiner*—John D. Lee
*Attorney, Agent, or Firm*—Laff, Whitesel, Conte & Saret

[57] ABSTRACT

A mechanical optical switching device has a plurality of input optical fibers coupled to the input side of the mechanical switching device for receiving incoming light beam signals. Individually associated with each optical fiber is an input collimating lens which is positioned to receive the incoming light beam and to convert it into parallel light beams. Optical path-switching means, having a uniform refractive index, are disposed at the rear or output of the input lens for switching the optical paths of the collimated parallel light beams emerging from the input lens means. A plurality of output optical fibers have individually associated output lenses for focusing the parallel light beams, after they have passed through the position controlled by the optical path-switching means. An electrically-controlled, mechanical switching device selectively inserts or removes the optical path-switching means into or away from a predetermined position in order to switch light from any incoming fiber to any outgoing fiber.

17 Claims, 8 Drawing Figures

| SWITCHING MODE | PORT OF CONNECTION | | | | POSITION OF DIELECTRIC MEMBERS | | | | | |
|---|---|---|---|---|---|---|---|---|---|---|
| | 1' | 2' | 3' | 4' | 13A | 13B | 13C | 13D | 13E | 13F |
| A | 1 | 2 | 3 | 4 | 0 | 0 | 0 | 0 | 0 | 0 |
| B | 1 | 2 | 4 | 3 | 0 | 1 | 0 | 0 | 0 | 0 |
| C | 1 | 3 | 2 | 4 | 0 | 0 | 1 | 0 | 0 | 0 |
| D | 1 | 3 | 4 | 2 | 0 | 1 | 1 | 0 | 0 | 0 |
| E | 1 | 4 | 2 | 3 | 0 | 0 | 1 | 0 | 1 | 0 |
| F | 1 | 4 | 3 | 2 | 0 | 0 | 1 | 0 | 1 | 1 |
| G | 2 | 1 | 3 | 4 | 1 | 0 | 0 | 0 | 0 | 0 |
| H | 2 | 1 | 4 | 3 | 1 | 0 | 0 | 0 | 1 | 0 |
| I | 2 | 3 | 1 | 4 | 0 | 0 | 1 | 1 | 0 | 0 |
| J | 2 | 3 | 4 | 1 | 0 | 1 | 1 | 1 | 0 | 0 |
| K | 2 | 4 | 1 | 3 | 0 | 0 | 1 | 1 | 1 | 0 |
| L | 2 | 4 | 3 | 1 | 0 | 1 | 1 | 1 | 1 | 0 |
| M | 3 | 1 | 2 | 4 | 1 | 0 | 1 | 0 | 0 | 0 |
| N | 3 | 1 | 4 | 2 | 1 | 1 | 1 | 0 | 0 | 0 |
| O | 3 | 2 | 1 | 4 | 1 | 0 | 1 | 1 | 0 | 0 |
| P | 3 | 2 | 4 | 1 | 1 | 1 | 1 | 1 | 0 | 0 |
| Q | 3 | 4 | 1 | 2 | 0 | 0 | 1 | 1 | 1 | 1 |
| R | 3 | 4 | 2 | 1 | 0 | 1 | 1 | 1 | 1 | 1 |
| S | 4 | 1 | 2 | 3 | 1 | 0 | 1 | 0 | 1 | 0 |
| T | 4 | 1 | 3 | 2 | 1 | 1 | 1 | 0 | 1 | 0 |
| U | 4 | 2 | 1 | 3 | 1 | 0 | 1 | 1 | 1 | 0 |
| V | 4 | 2 | 3 | 1 | 1 | 1 | 1 | 1 | 1 | 0 |
| W | 4 | 3 | 1 | 2 | 1 | 0 | 1 | 1 | 1 | 1 |
| X | 4 | 3 | 2 | 1 | 1 | 1 | 1 | 1 | 1 | 1 |

MECHANICAL OPTICAL SWITCHING DEVICES

This invention relates to optical switching devices for use in communication systems and, more particularly, to mechanical optical switching devices for switching optical transmission paths.

Reference is made to two co-pending applications by Mr. Tsutomu Aoyama, who is one of the joint inventors of this application, all inventions being assigned to the same assignee. Both of these applications are entitled "Mechanical Optical Switching Device," Ser. Nos. 968,698 (filed Dec. 12, 1978), now U.S. Pat. Nos. 4,239,331, and 097,648 (filed Nov. 27, 1979).

Optical switching devices for the mutual connection and disconnection of optical transmission paths are indispensable for communication systems using optical fibers as a transmission media. These optical transmission media have been intensively developed, while attracting a great public attention.

A conventional optical switching device, based on the optical integration techniques, is described in a paper entitled "Electrically Switched Directional Coupler: Cobra," by M. Papuchon et al., APPLIED PHYSICS LETTERS, Vol. 27, No. 5, pp. 289 to 291; Sept. 1, 1975. This "Cobra" switching device can be operated at a high switching speed. However, it has a disadvantage in that the device has a large insertion loss and is greatly affected by changes in temperature. To solve these problems, the "Cobra" switching device employs a mechanical optical switching device, with a low insertion loss, but also with a relatively slow switching speed. For more details about this switching device, reference may be made to a paper entitled "Optical Switching System Experiment" by H. Ogiwara et al., IEEE Transactions on Communications, Vol. COM-27, No. 2, pp. 517-521, Feb. 1979. This paper was read and distributed at the Technical Group Meeting on Switching Engineering of the Institute of Electronic and Communication Engineers of Japan, which was held on July 27, 1978 in Tokyo, Japan. Since the switching device discussed in the IEEE paper is a $1 \times 2$ type switch, seventeen $1 \times 2$ type switches are required to construct a $4 \times 3$ switch network. The switch network is thus complicated because it causes a large insertion loss.

One object of the invention is, therefore, to provide a mechanical optical switching device having a low insertion loss.

According to one aspect of the invention, a mechanical optical switching device has first and second optical fibers at its input side. First and second lenses collimate the fiber transmitted light beams, into parallel light beams, as they emanate from these first and second optical fibers. The mechanical optical path-switching means has a uniform refractive index and is disposed at the rear of the first and second lenses. Third and fourth lenses are disposed at the rear of the mechanical optical path-switching means for focusing the parallel light beams, after having passed through the optical path-switching means, upon third and fourth optical fibers at the output side of the switch. A mechanical switch moves a dielectric light-transmitting and refracting member in order to switch light paths between the various optical fibers.

The invention will be described in greater detail in conjunction with the accompanying drawings, in which.

Figure 1:
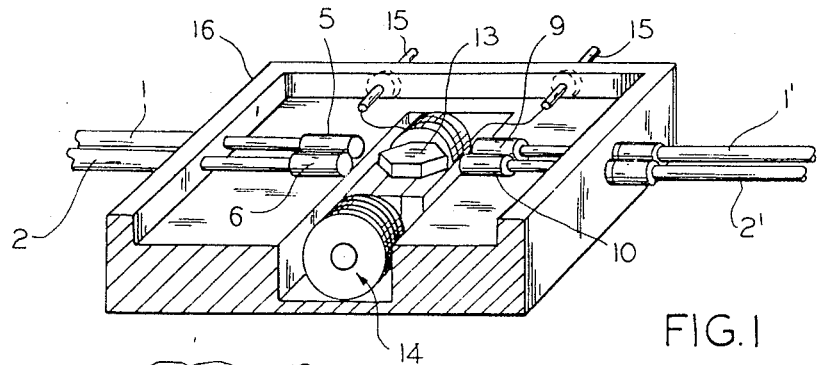
FIG. 1 is a perspective view of one embodiment of the invention (partially broken away to show the internal construction thereof)

FIG. 1 illustrates one embodiment of the invention which is a $2 \times 2$ mechanical optical switching device. First and second input optical fibers 1 and 2 enter the input side of the switching device, where first and second cylindrical rod-shaped lenses 5 and 6 collimate the light beams, emanating therefrom, into parallel light beams.

A dielectric light-transmitting member 13 has a uniform refractive index and is disposed at the rear of the first and second lenses 5 and 6, for switching the optical paths of the parallel light beams passing through the first and second lenses 5 and 6. The member 13 has spaced parallel upper and lower sides and at least four other sides which are perpendicular to and located between the spaced parallel sides. Each of the four sides is set at an angle, with respect to the light beam paths, for refracting the light beams from an incoming path to a selected outgoing path. Third and fourth cylindrical rod-shaped lenses 9 and 10 focus the parallel light beams after they have either passed through the dielectric member 13 or travelled directly from the lens 5,6. Third and fourth output optical fibers 1' and 2', at the output side of the device, receive the light beams passing through and focused by the third and fourth lenses 9 and 10. Driver 14 mechanically inserts or removes the dielectric member 13 into or away from the axial lines of the first and second lenses 5 and 6.

The components described thus far are housed in a case 16 which is made of any suitable non-magnetic material, such as stainless steel or resin. The input fibers 1 and 2 enter the side wall of the case 16 through two input ports which are opposite the location where the output fibers 1' and 2' leave the side wall of the case through two output ports. With this arrangement, straight optical paths are respectively formed between fibers 1 and 1' and between fibers 2 and 2'. The input rod lenses 5 and 6, for collimating the light beams emanating from the fibers 1 and 2, are provided at the rear or output end of the input fibers 1 and 2. The output rod lenses 9 and 10, for focusing the parallel light beams emanating from the input rod lenses 5 and 6, are provided in front of or at the input ends of the output fibers 1' and 2'. The dielectric light-transmitting member 13 is disposed between the input lenses 5,6 and the output lenses 9,10, in order to switch the optical paths of the light beams emanating from the lenses 5 and 6. Driver 14 mechanically inserts or removes the member 13 into or away from the spaced parallel optical paths between the lenses 5,6 and 9,10, respectively. Terminals 15,15 are power source supply terminals for the driver 14.

Figure 2:
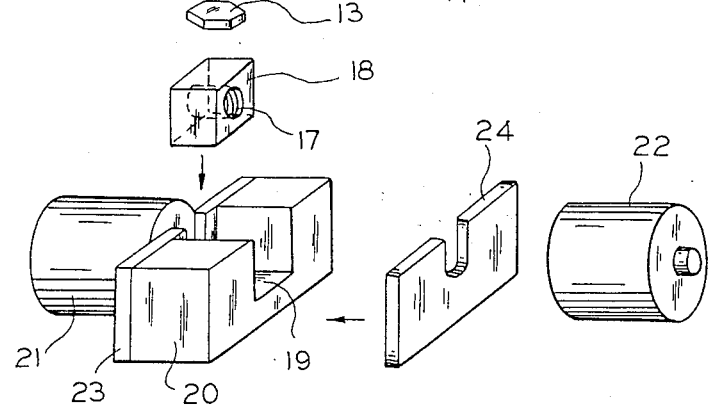
FIG. 2 is an exploded view, in perspective, of a part of the embodiment shown in FIG. 1.

Turn now to FIG. 2 which shows an enlarged and exploded view of the driver 14 of FIG. 1. The driver 14 has an associated holder 18 for a permanent magnet 17. The dielectric light-transmitting member 13 is fixed onto the top of holder 18. The driver 14 has a guide member 20 with a channel or groove 19, along which the holder 18 slides. Electromagnets 21 and 22 are positioned in spaced-apart alignment to attract or repel permanent magnet 17 and thereby drive the holder 18. A pair of motion-limiting stops 23 and 24 prevent the holder 18 from moving beyond the ends of the groove 19.

The operation of the optical device of FIG. 1 will be described next, with reference to FIG. 3, which shows the spaced parallel light paths between lenses 5,6 and 9,10, respectively, by dashed lines, and switched light paths by solid lines.

Figure 3:
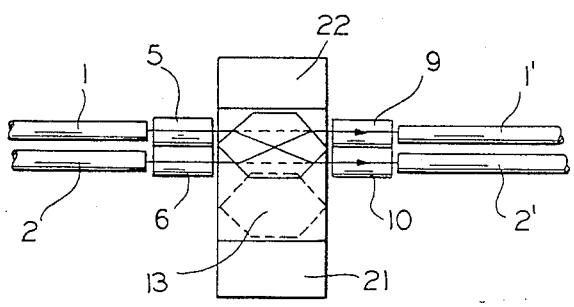
FIG. 3 is a schematic diagram for illustrating the operation of the device shown in FIG. 2.

Next, it is assumed that the electromagnets 21 and 22 are energized to produce a magnetic polarity such that the holder 18 for dielectric light-transmitting member 13 is attracted by the electromagnet 21 and repelled by the electromagnet 22; that is to say, the dielectric member 13 is positioned as indicated by dotted lines (FIG. 3). Under this condition, the light beams emitted through the input fibers 1 and 2 and collimated by the lenses 5 and 6 travel over spaced parallel paths and are focused by the lenses 9 and 10 upon the ends of fibers 1' and 2' (again, as shown by dashed lines).

When electromagnets 21 and 22 are energized to produce opposite magnetic polarities, the holder 18 for member 13 is positioned to the position shown by solid lines. The optical paths of the collimated beams, coming from the lenses 5 and 6, are switched within the dielectric light-transmitting member 13 (see the solid line of FIG. 3). The lenses 9 and 10 focus the light beams received via the switched optical paths onto the ends of fibers 1' and 2', whereby the path from fiber 1 is effectively connected to fiber 2' and the path from fiber 2 is effectively connected to fiber 1'.

As described above, the light beam from the fiber 1 is directed toward either fiber 1' or 2' and the light beam from the fiber 2 toward either the fiber 2' or 1', depending on whether the dielectric light-transmitting member 13 is or is not inserted into the axial lines of the lenses 5 and 6.

Figure 4:
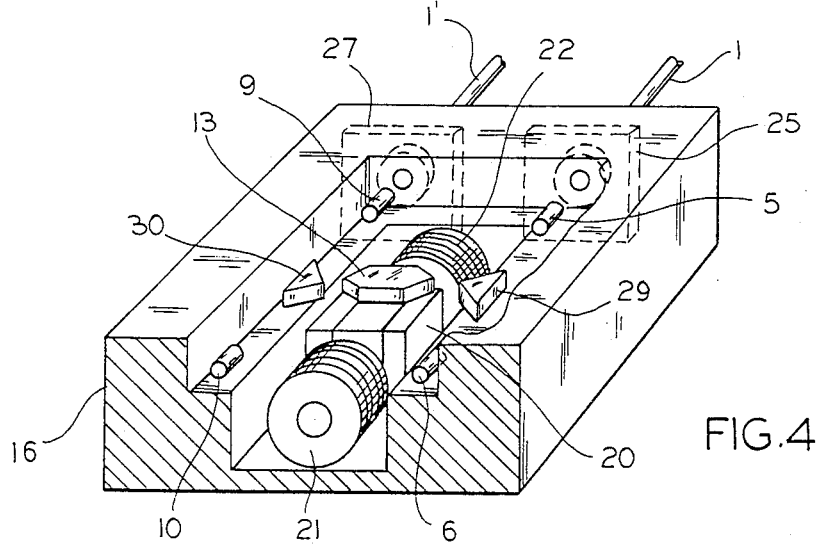
FIG. 4 is a perspective, partially broken away, view of another embodiment of the invention.
Figure 5:
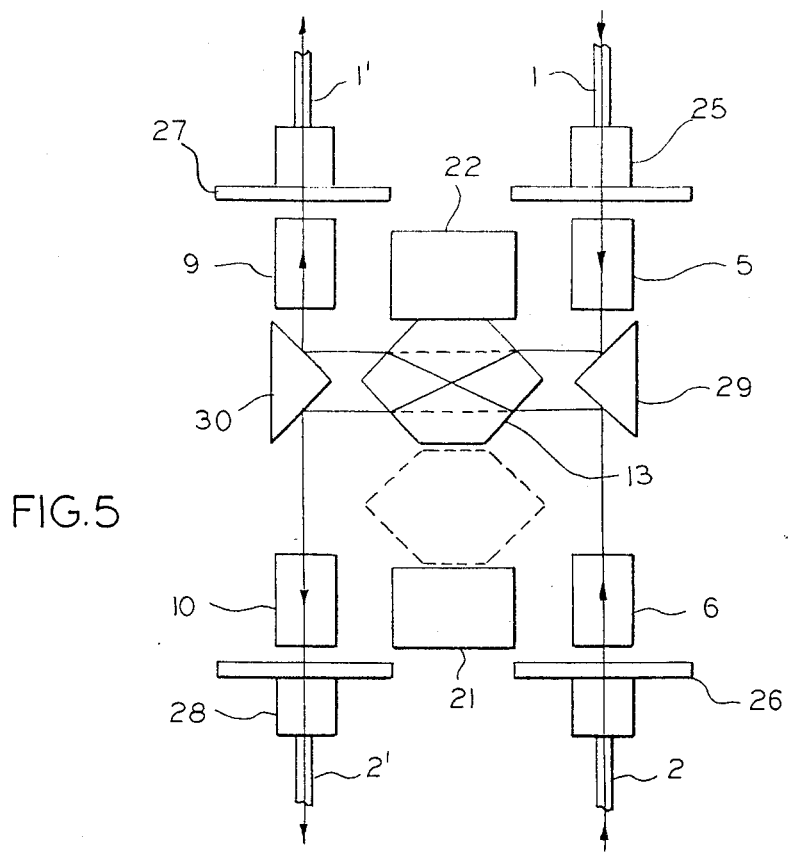
FIG. 5 is a schematic diagram for illustrating the operation of the device of FIG. 4.

FIGS. 4 and 5 show a second embodiment of a 2×2 switching device, comprising receptacles 25 to 28 for receiving fibers 1, 2, 1' and 2'. Mirrors 29 and 30 are triangular glass members with multi-layers of dielectric material formed on the glass substrate by a vacuum deposition process. In this second embodiment, the input and output fibers 1 and 1' are disposed on one side wall of case 16 to form an optically coupled path. Also, the input and output fibers 2 and 2' are disposed on the opposite side wall of case 16 to form a similar optically coupled path. The other construction details of the second embodiment of FIGS. 4, 5 are substantially the same as the corresponding details of the first embodiment. Therefore, the description thereof will be omitted.

Next, the switching operation of the second embodiment will be described with reference to FIG. 5. Again, the spaced parallel light paths are shown with dashed lines and the switched paths by solid lines.

Assume first that the electromagnets 21 and 22 are energized in such a manner that the dielectric light-transmitting member 13 is attracted to the electromagnet 21 and repelled from the electromagnet 22, as indicated by dotted lines in FIG. 5. On this assumption, the light beams emanating from the input fibers 1 and 2 are collimated by the lenses 5 and 6, respectively. The mirrors 29 and 30 reflect the collimated light beams in spaced parallel paths onto focusing lenses 9 and 10 and then into the output fibers 1' and 2', respectively (see dashed lines).

When the electromagnets 21 and 22 are energized to produce opposite magnetic polarities, the block 20 slides toward electromagnet 22 so that the dielectric light-transmitting member 13 is positioned as shown by a solid line (FIG. 5). The collimated light beams coming from the input fibers 1,2 and the lenses 5 and 6 are reflected by the mirror 29, and then are switched within the member 13, as shown by solid lines. Thus, the switched light beams are again reflected by the mirror 30 onto the focusing lenses 10 and 9 and their associated output fibers 2' and 1', respectively. In this manner, the light beams emanating from the input fibers 1 and 2 are directed toward either the output fibers 1' and 2' or the fibers 2' and 1' depending on whether or not the dielectric light-transmitting member 13 is or is not inserted in the spaced parallel light paths between the mirrors 29 and 30.

Figure 6:
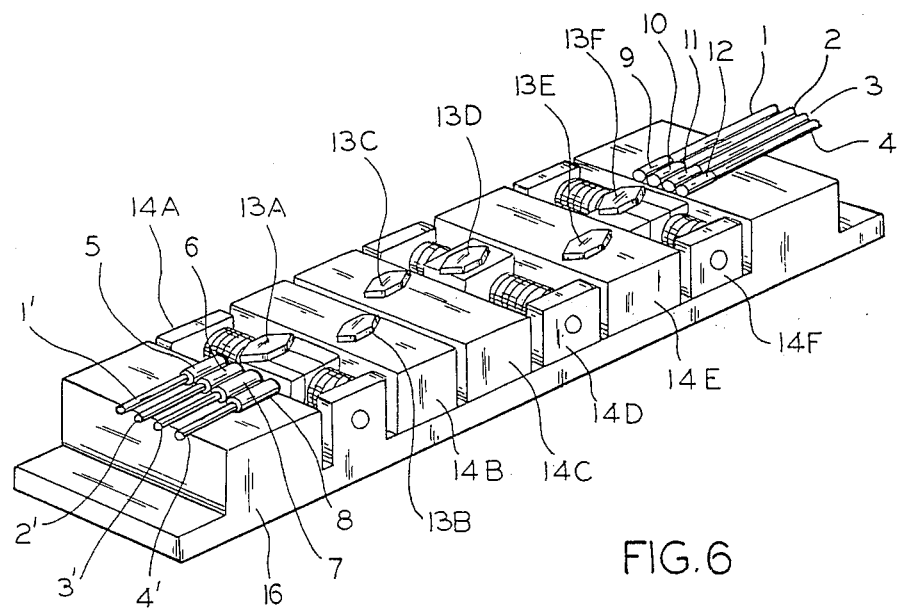
FIG. 6 is a perspective view of a third embodiment of the invention.

In FIG. 6, a third embodiment provides a 4×4 switching device, having four input fibers 1' to 4' at one end of the case 16 and four output fibers 1 to 4 at the opposite end of the case. Rod lenses 5 to 8 and 9 to 12 are disposed at the rear of the fibers 1' to 4' and in front of the fibers 1 to 4, respectively.

Six dielectric light-transmitting members 13A to 13F are disposed in series between the input fibers 1' to 4' and the output fibers 1 to 4, in order to switch the optical paths of the light beams received from the input fibers 1' to 4'. Among those members 13A to 13F, the members 13A and 13D switch the optical paths of the input fibers 1' and 2'; the members 13B and 13E switch the optical paths of the input fibers 3' and 4'; and the members 13C and 13F switch the optical paths of the input fibers 2' and 3'. The members 13A to 13F are individually driven by drivers 14A to 14F, respectively, each of which has a construction which is substantially the same construction of the driver shown in FIG. 2.

Figures 7, 8:
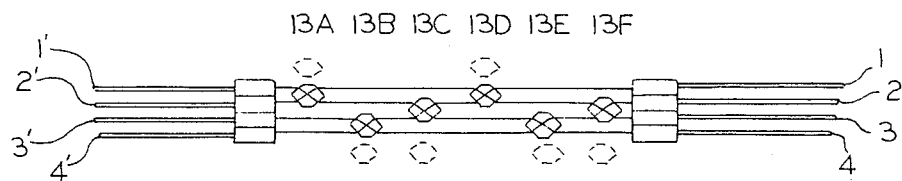
FIGS. 7 and 8 are schematical and graphical diagrams, respectively, for illustrating the operation of the device of FIG. 6.

The operation of the third embodiment will be described in greater detail, with reference to FIGS. 7 and 8. In FIG. 8, the numeral "1" appearing in the "Position of Dielectric Members" columns represents a condition when the corresponding dielectric light-transmitting members 13A to 13F is physically positioned in the corresponding optical paths of two given input fibers (as depicted by the solid line of FIG. 7). The numeral "0" represents a condition when the corresponding dielectric member is displaced at some interval away from the optical paths, as depicted by dotted lines. Also, the "Port of Connection" columns of FIG. 8 show the connection relationships between the input fibers 1' through 4' and the output fibers 1 through 4 (marked at the heads of the columns). For example, in a switching mode A, all of the members 13A to 13F are disposed some interval from the optical paths of the input fibers 1' to 4' (see the dotted lines, FIG. 7). The light beams emanating from the input fibers 1' and 4' travel in their normal straight and parallel paths from the corresponding output fibers 1 to 4. In a mode X, by way of comparison, the members 13A to 13F are all positioned as depicted by solid lines (FIG. 7). Therefore, the optical path of the light beam from the input fiber 1' is first switched to the normal optical path of the fiber 2' by the member 13A, then to the normal optical path of the fiber 3' by the member 13C and, finally, to the normal optical path of the fiber 4' by the member 13E, to exit the switch via the output fiber 4. Similarly, the light beam emanating from the input fiber 2' is switched to enter the output fiber 3. The light beam from the input fiber 3' is switched to the output fiber 2. The light beam from the input fiber 4' is switched to the output fiber 1.

In this way, the input fibers 1' to 4' are selectively connected to the output fibers 1 to 4 in any switched relationship depending on the operated or unoperated combination of the members 13A to 13F. The individual positions of the various members 13A to 13F may be changed depending on the magnetic polarity of the electromagnets used in the driver 14A to 14F.

The pertinent characteristics of optical switching devices designed and constructed on the basis of the structure of FIGS. 1, 4 and 6 were measured, as follows:

| Switch Structure | 2 × 2 Switch (FIG. 1) | 2 × 2 Switch (FIG. 4) | 4 × 4 Switch (FIG. 6) |
| --- | --- | --- | --- |
| Insertion Loss | 1.2 dB (decibel) | 1.5 dB | 0.3 to 1.3 dB |
| Crosstalk | Less than −55 dB | Less than −55 dB | Less than −55 dB |
| Switching Time | 9m sec. (milliseconds) | 9m sec | 26m sec |

The following materials and physical dimensions were used as components in these switching devices. Graded-index rod lenses were used for the various rod-shaped lenses 5 to 12 of the 2×2 switches (FIGS. 1 and 4) and of the 4×4 switch (FIG. 6). Each lens in the 2×2 switch may be 2 mm in length and 1.8 mm in diameter and in the 4×4 switch may be 8 millimeters in length and 2 millimeters in diameter. The fibers 1 to 4 and 1' to 4' may be a graded-index type of optical fibers with a core diameter of sixty microns and an N.A. (numeral aperture)=0.21. Light-emitting diodes, with the wavelength of 0.85 microns, may be used as the light source (not shown). The drive voltage and current for the electromagnets 21 and 22 may be 12 v and 50 mA for the 2×2 switch or 48 volts and 88 milliamperes for the 4×4 switch. The refractive index of each dielectric member 13A to 13F is 1.52, and the interval between the light entering surface and the light-emitting surface is 6 mm.

In the above table, the switching time is the time period beginning at the instant when the drive current flows and ending when the light beam with the light intensity of 100% is weakened to the light intensity of 10%, or the time period taken for the light intensity of 0% to grow to become the intensity of 90%.

As described above, the invention provides a novel mechanical optical switching device with a simple structure and a low insertion loss.

Those who are skilled in the art will readily perceive how to modify the system. Therefore, the appended claims are to be construed to cover all equivalent structures which fall within the true scope and spirit of the invention.

What is claimed is:

1. A mechanical optical switching device comprising:
    a. first and second input optical fiber means coupled to an input side of the device for transmitting incoming light beam signals into said switching device;
    b. input collimating lens means having first and second collimating lenses for converting the incoming light beams into parallel light beams;
    c. optical path-switching means having a uniform refractive index and being disposed at the rear of said input lens means, said optical path-switching means having spaced parallel upper and lower surfaces with two input sides and two output sides which are substantially perpendicular to and located between the spaced parallel surfaces, each of said input and output sides being set at a predetermined angle with respect to one of the parallel light beams for refracting one of the parallel light beams received from said input lens means for switching the optical paths of one of the parallel light beams passing through said input lens means, the light beams normally following parallel paths through said switching means and crossing over within the switching means during switched conditions;
    d. output lens means having third and fourth lenses and being disposed at the rear of the optical path-switching means for focusing the parallel light beams passing through said optical path-switching means;
    e. third and fourth output optical fiber means at the output side of the device, each of said output fiber means receiving one of the light beams from said output lens means; and
    f. mechanical switching means for selectively inserting or removing said optical path-switching means into or away from a predetermined position.

2. A mechanical optical switching device as claimed in claim 1, wherein said optical path-switching means is disposed between said input and output lens means.

3. A mechanical optical switching device comprising:
    a. first and second input optical fiber means coupled to an input side of the device for transmitting incoming light beam signals into said switching device;
    b. input collimating lens means having first and second collimating lenses for converting the incoming light beams into parallel light beams;
    c. output lens means;
    d. optical path-switching means having a uniform refractive index and being disposed at the rear of said input lens means and in front of said output lens means for normally transmitting light in parallel paths, said optical path-switching means selectively switching the optical paths of the parallel light beams passing through said input lens means to cross over from one output to another of said switching means;
    e. said output lens means having third and fourth lenses and being disposed at the rear of the optical path-switching means for focusing the parallel light beams passing through said optical path-switching means;
    f. third and fourth output optical fiber means at the output side of the device, each of said output fiber means receiving one of the light beams from said output lens means;
    g. a plurality of receptacle means for individually receiving each of said first to fourth optical fiber means;
    h. first reflecting means disposed between said first and second lenses for reflecting the incoming light beams after passing through said first and second lenses;

i. second reflecting means disposed between said third and fourth lenses for reflecting the light beams from said first reflecting means toward said third and fourth lenses; and j. mechanical switching means for selectively inserting or removing said optical path-switching means into or away from a predetermined position.

4. A mechanical optical switching device as claimed in claim 3, wherein said optical path-switching means is disposed between said first and second reflecting means.

5. A mechanical optical switching device comprising:

a. first to fourth input optical fiber means at the input side of the device for transmitting incoming light beam signals into said switching device;

b. input collimating lens means having first to fourth lenses for converting the incoming light beams into parallel light beams;

c. six transparent dielectric light-transmitting means successively disposed at the rear of said input lens means, each of said light-transmitting means having a uniform refractive index for selectively transmitting light in parallel paths or switching over the collimated parallel light beams between separate optical paths;

d. output focusing lens means positioned behind said light-transmitting means and having fifth to eighth lenses for focusing the parallel light beams;

e. fifth to eighth output fibers at the output side of the device for selectively receiving one of the light beams emanating from said output lens means; and f. mechanical switching means for selectively inserting or removing each of said dielectric members into or away from given positions.

6. A mechanical optical switching device having two input ports and two output ports with spaced parallel light paths normally extending between them, optical fiber means individually associated with each of said ports and coupled through individually associated cylindrical rod-shaped lenses to the interior of said switching device, the rod-shaped lens associated with each fiber in one of said input ports collimating the incoming light into parallel light beams, the rod-shaped lens associated with each fiber in one of said output ports focusing outgoing light beams into the end of the fiber, and switch means including at least one light-transmitting member having a uniform refractive index for normally transmitting light in parallel paths and being movably positioned between said input and output ports for selectively refracting light to switch over from an input port to an output port, said switch means comprising means for moving said light-transmitting member into or out of at least one optical path extending from an input port to an output port, each of said light-transmitting members having spaced parallel upper and lower surfaces and at least four other sides which are substantially perpendicular to and positioned between the spaced parallel surfaces, and each of said four sides on said light-transmitting means being set at angles with respect to said optical path which refract light in order to switch the light in each of said parallel paths from an input port and cross over to a different one of said parallel paths leading to an output port.

7. The optical switching device of claim 6 and electrically-controlled drive means individually associated with and selectively moving each of said light-transmitting members into or out of a light path between said input and said output ports whereby light in said path either travels directly through said path or is switched out of said path.

8. The optical switching device of claim 7 wherein said drive means comprises an opposed pair of spaced-apart electromagentic means on opposite sides of a light transmission path, a block having magnetic polarization slidably mounted for bidirectional travel between said spaced electromagnetic means responsive to the polarity of said electromagnetic means, and said light-emitting member being mounted on said block in a position where said member moves into or out of said light transmission path responsive to the bidirectional travel of said block.

9. A mechanical optical switching device having two input ports and two output ports with spaced parallel light paths extending between them, reflector means in said spaced parallel light paths for redirecting light without switching it between different light paths, optical fiber means individually associated with each of said ports and coupled through individually associated cylindrical rod-shaped lenses to the interior of said switching device, the rod-shaped lens associated with each fiber in one of said input ports collimating the incoming light into parallel light beams, the rod-shaped lens associated with each fiber in one of said output ports focusing outgoing light beams into the end of the fiber, and switch means including at least one light-tranmsitting member having a uniform refractive index and being movably positioned between said input and output ports for selectively refracting light from an input port directly to and output port or to switch said light beam to cross over to another output port, said switch means comprising means for moving said light-transmitting member into or out of at least one optical path extending from an input port to an output port, each of said light-transmitting members having spaced parallel upper and lower sides and at least four other sides which are substantially perpendicular to and between the spaced parallel sides, each of the four sides being set at an angle with respect to said optical path for refracting a light beam in said optical path from an input port to any of a plurality of said output ports.

10. The optical switching device of claim 9 wherein these are two of said reflector means respectively positioned on opposite sides of said light-transmitting member.

11. The optical switching device of claim 10 and electrically-controlled drive means individually associated with and selectively moving each of said light-transmitting members into or out of a light path between said input and said output ports whereby light in said path either travels directly through said path or is switched out of said path.

12. The optical switching device of claim 11 wherein said drive means comprises an opposed pair of spaced-apart electromagnetic means on opposite sides of a light transmission path, a block having magnetic polarization slidably mounted for bidirectional travel between said spaced electromagnetic means responsive to the polarity of said electromagnetic means, and said light-transmitting member being mounted on said block in a position where said member moves into or out of said light transmission path responsive to the bidirectional travel of said block.

13. The optical switching device of claim 9 and electrically-controlled drive means individually associated with and selectively moving each of said light-transmitting members into or out of a light path between said input and said output ports whereby light in said path either travels directly through said path or is switched out of said path.

14. The optical switching device of claim 13 wherein said drive means comprises an opposed pair of spaced-apart electromagnetic means on opposite sides of a light transmission path, a block having magnetic polarization slidably mounted for bidirectional travel between said spaced electromagnetic means responsive to the polarity of said electromagnetic means, and said light-transmitting member being mounted on said block in a position where said member moves into or out of said light transmission path responsive to the bidirectional travel of said block.

15. A mechanical optical switching device having four input ports and four output ports, with four spaced parallel light paths extending between them, a plurality of light-transmitting members positioned in series between said input and output ports, each of said light-transmitting members having spaced parallel upper and lower sides and at least four other sides which are substantially perpendicular to and between the spaced parallel sides, each of the four sides being set at an angle with respect to said optical path for refracting a light beam in one of said optical paths to cross over into another of said optical paths, optical fiber means individually associated with each of said ports and coupled through individually associated cylindrical rod-shaped lenses to the interior of said switching device, the rod-shaped lens associated with each fiber in one of said input ports collimating the incoming light into parallel light beams, the rod-shaped lens associated with each fiber in one of said output ports focusing outgoing light beams into the end of the fiber, and switch means including at least one of said light-transmitting members having a uniform refractive index normally transmitting light in said parallel paths and being movably positioned between said input and output ports for selectively refracting light and crossing over the parallel paths from an input port to an output port, said switch means comprising means for moving said light-transmitting member into or out of at least one optical path extending from an input port to an output port.

16. The optical switching device of claim 15 and electrically-controlled drive means individually associated with and selectively moving each of said light-transmitting members into or out of a light path between said input and said output ports whereby light in said path either travels directly through said path or is switched out of said path.

17. The optical switching device of claim 16 wherein said drive means comprises an opposed pair of spaced-apart electromagnetic means on opposite sides of a light transmission path, a block having magnetic polarization slidably mounted for bidirectional travel between said spaced electromagnetic means responsive to the polarity of said electromagnetic means, and said light-transmitting member being mounted on said block in a position where said member moves into or out of said light transmission path responsive to the bidirectional travel of said block.

* * * * *